United States Patent Office
2,882,185
Patented Apr. 14, 1959

2,882,185

WATER SOLUBLE BASIC POLYAMIDES AND THEIR ALKYLATION PRODUCTS

Emery I. Valko, Mountain Lakes, N.J., Giuliana C. Tesoro, Dobbs Ferry, N.Y., and Edward D. Szubin, Newark, N.J., assignors to Onyx Oil & Chemical Company, Jersey City, N.J., a corporation of Delaware No Drawing. Application April 13, 1956
Serial No. 577,946

6 Claims. (Cl. 117—139.5)

The invention relates to the preparation of basic polyamides, their soluble and insoluble alkylation products, and to the application and use of such products as durable antistatic finishes for textile materials.

The invention includes the basic polyamides and their soluble alkylation derivatives, the reaction of these polyamides and their soluble derivatives with cross-linking divalent or polyvalent alkylating agents to form insoluble derivatives and the products so produced; and also the treatment of textile materials with such soluble agents and the production of insoluble products by reaction with cross-linking agents and the improved textile materials resulting therefrom.

The soluble basic polyamide derivatives of the present invention may be represented by the following general formula:

Formula 1

$$\left[\left[(CH_2)_n-\underset{R}{N}-\right]_K-(CH_2)_n NHCOR'CONH-\right]_X$$

where K is an integer number having advantageously a value between 1 and 4, n is an integer number having a value of at least 2 and advantageously not greater than 8, R is hydrogen, alkyl or aralkyl, and R' is a divalent radical selected from the group of substituted and unsubstituted aliphatic, aromatic and alkylaromatic radicals, and X indicates the extent of polymerization. The two —CO— groups represented as linked by R' may also be linked together directly (in the case of oxalic acid derivatives), thus eliminating R'.

These soluble polymers may be prepared in the form of their salts by condensation of dibasic (dicarboxylic) acids (or their esters or anhydrides) with polyamines containing two primary amino groups and one or more secondary amino groups, followed by alkylation of the secondary nitrogen atoms, or they may be prepared directly by condensation of dibasic acids (or their esters or anhydrides or chlorides) with amines containing two primary amino groups, and one or more tertiary nitrogen atoms in the molecule.

As with other polymers, the above formula represents only the repeating unit of the polymeric molecule. The complete formula requires the representation of the terminating groups as well. These terminating groups can be formed by excess of one of the reagents, either the polyamine or the dicarboxylic acid. In the first case the terminating group at the left end of the molecule will be NH₂— and at the right end of the molecule

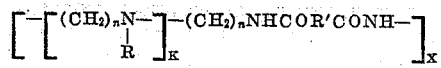

In the second case, the terminating group will be at the left end of the molecule

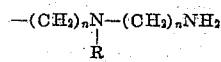

and at the right end of the molecule

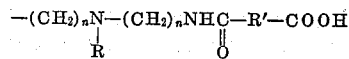

The hydrogen of the —OH groups at the ends of the molecules may be also substituted by alkyl radicals, as, when esters have been used for condensation in place of the acids or their anhydrides. It is also possible that one end of the molecule is formed by the amine radical and the other by the amido acid radical.

The insoluble basic polyamide derivatives of the invention may be represented by the following general formula:

Formula 2

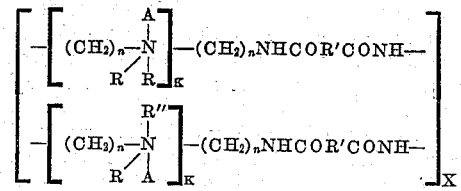

where R″ is a divalent radical selected from the group of substituted or unsubstituted aliphatic or alkylaromatic radicals, R, K, n, R' and X have the meaning as above and A is an anion.

These insoluble polymers can be prepared by cross-linking the soluble polymers previously described with a divalent alkylating agent such as a dihalide or other diester.

It is understood that, as is generally the case in polymer chemistry, the reactions are not uniform for every repeating and terminating unit. The alkylation can be a partial one affecting only a certain fraction of the repeating units, probably in a random fashion. More or less than half of the basic nitrogen atoms might be alkylated either by mono- or bifunctional alkylating agents or their mixtures. Unit groups such as represented in Formula 1 and such as represented in Formula 2 might be present in the same molecule distributed in a random fashion and the compound might contain a mixture of molecules of Formula 1 and of Formula 2, as well as molecules which contain both types of unit groups.

The insoluble cross-linked polymers are advantageously formed on the textile material by impregnating it with a solution of the soluble polymer and with an appropriate amount of diester (as cross-linking agent), and heating to accelerate the cross-linking alkylation reaction, and the production of the insoluble finish on the textile material.

This finish increases the value and usefulness of textile materials. In particular, it reduces the tendency of the textile materials to accumulate electrostatic charges. It is known to the trade that impregnation of hydrophobic textile materials with certain compounds greatly reduces their tendency to accumulate electrostatic charges. Such compounds are commonly called antistatic agents or finishes. However, practically all these finishes are removed by laundering, or dry-cleaning or by merely rinsing with water. There is a definite need for a finish or treatment which would impart to textiles the property of dissipating electrostatic charges and which would withstand repeated laundering and dry-cleaning. Such a finish can be termed a durable antistatic finish. The compounds of the invention, when properly applied to hydrophobic textile materials, act as durable antistatic finishes, extremely resistant to washing and dry cleaning. The appearance and hand of the cloth are not unfavorably affected by the finish, and at the same time it is possible to impart a wide range of properties to the treated cloth (e.g. stiffness, softness, body) by adequately choosing the raw materials for the addition product applied.

Another extremely useful property of our new finishes on textile materials is to adsorb from an aqueous bath acid dyes and to hold them. Use can be made of this property to dye economically textile materials made from hydrophobic or cellulose fibers. Hydrophobic fibers can be dyed with known methods only with the aid of high pressure or with the assistance of certain compounds called carriers or with a selected and limited group of dyes. These dye methods impose severe limitation on the selection of color and depth of color and they are usually costly. Our new finish enables the finished fabric to be dyed by members of the large group of acid or wool dyes at comparatively low cost.

Dibasic acids and derivatives suitable for the preparation of the compounds of the invention are for instance: Adipic acid (and dimethyl adipate, adipic diamide), succinic acid (and succinic anhydride), "dimer acids" (e.g. Empol 1022—Emery Industries), terephthalic acid (and dimethyl terephthalate), diglycolic acid, sebacic acid (and dimethyl sebacate), oxalic acid (and diethyl oxalate and oxalyl chloride), azelaic acid, dodecenyl succinic acid (and anhydride) and the like.

Amines suitable for the preparation of the compounds of the invention are for instance: N-methyl-N, bis-(3-aminopropyl) amine, imino bis propylamine, diethylene triamine, triethylene tetramine, dipropylene triamine, and the like.

Alkylating agents suitable for the preparation of soluble products are for instance: benzyl chloride, polyethylene glycol halohydrins preferably of average molecular weights between 400 and 3000, n-1-bromododecane, ethyl bromide, methyl chloride and the like.

Alkylating agents suitable for the preparation of insoluble products are for instance: xylylene dichloride, dimethyl xylylene dichloride, epichlorohydrin, glycerol dichlorohydrin, polyethylene glycol dihalides preferably of average molecular weights between 400 and 3000, etc.

APPLICATION AND TESTING

An outstanding property of the new finish is to reduce or eliminate the tendency of textile materials, consisting of or prepared from hydrophobic fibers and filaments, to accumulate electrostatic charges.

Hydrophobic fibers are synthetic fibers which have a comparatively low capacity to retain moisture in comparison with such fibers as cotton, wool and rayon. Such fibers are nylon fibers (e.g. those called nylon 66 which are prepared by condensation of 1,6 hexamethylene diamine and adipic acid; those called nylon 6 which are prepared by polymerization of caprolactam); Orlon acrylic fibers (Orlon is a trademark of the E. I. du Pont de Nemours & Co.) prepared by polymerization of acrylonitrile; Dacron polyester fibers (Dacron is a trademark of the E. I. du Pont de Nemours & Co.) prepared by condensation of terephthalic acid and ethylene glycol; cellulose triacetate fibers (marketed under the trademark Arnel by the Celanese Corporation of America); Dynel fibers (Dynel is a trademark of the Carbide and Carbon Chemicals Co., a division of Union Carbide and Chemical Corporation) which are copolymers of acrylonitrile and vinyl chloride; Acrilan fibers (Acrilan is a trademark of the Chemstrand Corp.) and similar synthetic fibers.

Textile materials prepared from hydrophobic fibers accumulate electrostatic charges when exposed to rubbing, e.g. in processing, where the filament or fiber and its assemblies are led over guides, or in weaving, or even in use and wear.

In processing, accumulation of electrostatic charges may cause yarn ends to stick or tangle severely on machines. Charged fabrics may attract and hold tenaciously lint and soil, and they are often difficult to cut and sew. Finished garments have a tendency to cling to the body, and spark discharges may also occur, which in some instances (such as in the operating room or in electronic research laboratories) constitute a significant hazard.

The accumulation of charges is assumed to be due to the inability of the textile materials to dissipate the charges as fast as they are generated by rubbing. An adequate measure of the ability of the textile to dissipate charges is their electrical conductance (or electrical resistivity which is the reciprocal value of conductance). It is known that a specific area conductivity of the textile material higher than $10^{-12}$ reciprocal ohm (i.e. a specific area resistivity lower than $10^{12}$ ohm) is sufficient to consider the textile material as having no objectionable tendency for the accumulation of charges. A higher specific area resistance is usually indicative of the tendency to accumulate charges.

We define the specific area resistivity of the fabric as its electrical resistivity between two parallel metallic electrodes placed at a distance equal to their length. When the distance between electrodes is $n$ times higher than their length, the measured resistance must be divided by $n$ in order to obtain the specific area resistance. The instruments used to measure electrical resistance are well known (e.g. a Wheatstone bridge may be used, or a strip of fabric is placed between electrodes connected across a device for measuring electric potential (voltage) having a very high leakage resistance and a potential is then applied across the fabric; the source of potential is then disconnected from the electrodes. From the observed rate of discharge of the initial and from the capacitance of the system the specific area resistivity can be calculated).

The electric resistance of textile materials depends on their moisture content, which in turn is a function of the relative humidity of the surrounding atmosphere. Therefore measurement of electrical resistivity of the fabric must be carried out at a known relative humidity level, in order to give reproducible results. Most of our measurements were carried out at relative humidity between 30% and 50%.

The invention will be further illustrated by the following specific examples, but it will be understood that the invention is not limited thereto. The parts are by weight.

Example 1

87.1 parts of dimethyl adipate are mixed with 79.8 parts of freshly distilled N-methyl-N, bis-3-aminopropylamine (10% mol excess) in a reaction vessel equipped with gas inlet tube, thermometer and mechanical stirrer and connected to a vacuum pump. Oxygen free nitrogen is bubbled through the reaction mixture, and the temperature is raised to 160°. Distillation of methanol begins, and after heating for 1½ hours at 165°–175° at atmospheric pressure, 27.2 parts of methanol or 85% of the calculated amount are collected. 4.4 parts of dimethyl adipate are added (reducing the amine excess to 5% molar) and the temperature is raised to 185°. After 1½ hours at 185°–195° at atmospheric pressure, the total amount of methanol collected is 31.2 parts (or 93% of the calculated amount). 4.4 parts of dimethyl adipate are again added (bringing the charge to a stoichiometric ratio of ester to amine), and heating is continued for 1½ hours at 190–195°. The pressure is then gradually decreased to 20 mm. of mercury, and when distillation of methanol stops at 190°/20 mm., the reaction mixture is allowed to cool. The total amount of methanol collected is 32.0 parts or 91% of the amount calculated after the last addition of dimethyl adipate. This indicates that the condensation polymerization has proceeded to the extent of 91% of theoretical completion.

The product solidifies on cooling to a hard, red-brown brittle mass which is soluble in water, alcohol and other solvents. The product may be prepared in the form of its hydrochloride by adding 0.33 mol hydrochloric acid to each mol of amine used in the condensation reaction.

In the form of the free base, the product of this reaction may be alkylated with a mono ester of a suitable acid (such as for instance benzyl chloride) to form water soluble polyamidopoly quaternary ammonium salts; or it may be reacted with a diester of a suitable acid (such as for instance xylylene dichloride) to form cross-linked, water insoluble polyamidopoly quaternary ammonium compounds.

These latter insoluble polymers may advantageously be formed on textile materials and utilized as durable antistatic finishes.

*Example 2*

97.1 parts of dimethyl terephthalate and 72.6 parts of freshly distilled N-methyl-N-3 aminopropylamine are mixed in a reaction vessel equipped with mechanical stirrer and gas inlet tube and connected to a distillation apparatus. The mixture is heated (in an atmosphere of oxygen free nitrogen) to 135°, at which temperature distillation of methanol begins. The temperature is gradually raised to 200° over a period of 4 hours (at atmospheric pressure and during this time 25 parts (or 83.5% of the calculated amount) of methanol are collected. Heating is continued for 1 hour under reduced pressure (180°–200° at 35 mm. of mercury), and at the end of this time the product is allowed to cool.

The polymer is yellow, brittle, and easily ground to a powder. It is soluble in water at low pH, but is precipitated from water by alkali.

*Example 3*

2338 parts of adipic acid are melted in a reaction vessel equipped with gas inlet tube and mechanical stirrer, and connected to a distillation apparatus. Nitrogen is bubbled through the melted acid, and 1650 parts of freshly distilled diethylene triamine are added dropwise over a period of 80 minutes, maintaining the temperature of the reaction mixture at 150°–155°. During this time, 140 parts of water (or 24% of the calculated amount) distills over. After completing the addition of amine, the reaction mixture is kept at 150°–160° for two hours. At the end of this time, a total amount of water of 360 parts (or 63% of the calculated amount) has distilled. The temperature of the reaction mixture is then gradually raised to 200° over a period of 4 hours, and the total amount of water distilled is then 569 parts, or 98.5% of the calculated amount.

The product of the reaction,

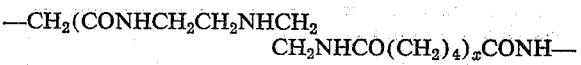

is a light yellow brittle solid of low softening point. It is soluble in water, alcohol and other organic solvents.

It can be alkylated readily by esters of suitable acids to form soluble (if monoesters are used), or insoluble (if diesters are used) alkylated polyamido amines. A typical alkylation reaction is described in Example 4.

*Example 4*

226.8 parts of the product of Example 3 (containing 2.0 mols of secondary basic nitrogen to be alkylated) are heated to 145° in a vessel equipped with mechanical stirrer, gas inlet tube and reflux condenser, under rigid exclusion of air. 190 parts (1.5 mols) of benzyl chloride are then added dropwise over a period of 15 minutes during which the exothermic reaction maintains the temperature at 145°–175°. Heating is continued at 175°–180° for ½ hour after completing addition of the benzyl chloride, and the reaction mass is then allowed to cool. An argentometric titration indicates that all of the benzyl chloride added has reacted, giving ionic chloride.

The product is hygroscopic, soluble in hot water, and in alcohol and is precipitated by alkali. About ¾ of the repeating units in the product correspond to the following formula:

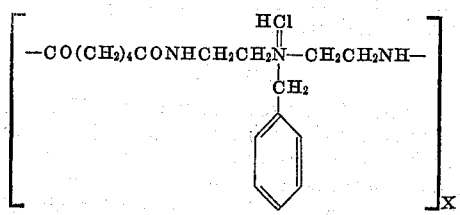

(The product contains about 25% non-benzylated basic nitrogen, due to the ratio of benzyl chloride employed in the alkylation.)

The free base of the above product (precipitated from aqueous solution by addition of alkali) may be further alkylated to form soluble or insoluble polyamido polyquaternary ammonium salts, which exhibit useful and desirable properties.

*Example 5*

266 parts of dodecenyl succinic anhydride are heated in a reaction vessel equipped with mechanical stirrer, gas inlet tube, and connected to a distillation apparatus. Nitrogen is bubbled through the liquid, and 103.2 parts of freshly distilled diethylene triamine are added dropwise with stirring over a period of 30 minutes. The temperature is maintained at 130°–150°, and at 150° distillation of water begins. After completing addition of the amine, the temperature is gradually raised to 185° over a period of three hours, during which 21 parts or slightly more than the calculated amount of water are distilled. (The excess distillate is probably due to decomposition products carried by the water.)

The product is a viscous syrup, insoluble in water and dilute acid, but soluble in concentrated acid. The structure of the product (disregarding the end groups) is as follows:

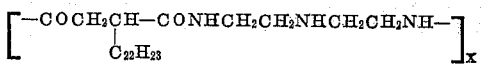

The color of the product is only slightly darker than that of the dodecenyl succinic anhydride used in its preparation.

*Example 6*

690 parts of dimethyl sebacate are mixed with 309 parts of freshly distilled diethylene triamine in a vessel equipped with mechanical stirrer, and gas inlet tube and connected through a condenser or receiver with a vacuum pump. The mixture is heated in an atmosphere of nitrogen to 130°, and distillation of methanol begins. The reaction is somewhat exothermic. After heating for 75 minutes at 130°–140°, 123 parts of methanol have distilled (or 64% of the calculated amount). The temperature is gradually raised to 200° over a period of four hours, and the total amount of distillate at the end of this time is 192 parts or 100% of the calculated amount.

The product is a hygroscopic, flexible soft mass which dissolves clearly and easily in acidic water and in alcohol, but gives only a hazy solution in pure water.

*Example 7*

400 parts of azelaic acid and 206.3 parts of freshly distilled diethylene triamine are mixed in a reaction vessel equipped with mechanical stirrer and gas inlet tube and connected through a condenser and a receiver. Nitrogen is bubbled through the mixture, and the temperature is gradually raised to 150°. Distillation of water begins, and after heating for 2 hours at 140°–150°, 40 parts of water have distilled (55% of the calculated amount). The temperature is then gradually raised to 200° over a period of 4 hours, and at the end of this time, 72 parts (100% of the calculated amount) of water have distilled. On cooling, the product solidifies to a reddish elastic mass.

*Example 8*

174.2 parts of dimethyl adipate and 131.0 parts of bis (3 aminopropyl) amine are heated in a current of nitrogen in a reaction vessel equipped with mechanical stirrer and connected to a distillation apparatus. After 70 minutes at 140°–150°, 49 parts of methanol have been distilled (or 76% of the calculated amount). The temperature is then gradually raised to 200° over a period of 2 hours, and at the end of this time the total distillate weighs 56.5 parts (or 88% of the theoretical).

The product solidifies on cooling to a reddish brown hygroscopic mass which is soluble in water, alcohol and other organic solvents.

*Example 9*

20 parts of the condensation product of dimethyl adipate and N-methyl-N-bis-(3 aminopropylamine) prepared in accordance with Example 1 and 48 parts dimethylxylylene dichloride [bis (chloromethyl) xylylene] are dissolved in 80 parts isopropyl alcohol.

A white nylon taffeta fabric is impregnated with the solution on a two-roll padding machine and squeezed free from excess liquid. The fabric has retained 22% solution by its own weight. It is dried for 5 minutes at 120° C. and placed in a curing oven for 10 minutes at 140° C.

A fabric of comparatively stiff hand is obtained, which shows no tendency to accumulate electrostatic changes, quite contrary to the behavior of the untreated fabric. Even after laundering the fabric retains its lack of tendency to accumulate the charges.

The finished fabric can be dyed with an aqueous solution of Azo Rhodin 2G (Colour Index No. 31) to a deep red shade. The untreated fabric remains in the same dye bath practically untinted.

*Example 10*

20 parts of the condensation product of dimethyl adipate and N-methyl-N-bis (3 aminopropylamine) prepared according to Example 1 and 10 parts of the compound having the approximate formula of $$I(CH_2CH_2O)_{12}CH_2CH_2I$$

(the diiodide derivative of the commercial product sold under the trade name Polyethylene glycol 600 by Carbide & Carbon Chemical Corporation, a division of Union Carbide & Chemical Corporation) are dissolved in 70 parts of water.

This solution is used to impregnate a desized, bleached, undyed Dacron taffeta fabric on a laboratory two roll padder. (Dacron fabrics are woven from polymeric ethylene glycol terephthalic ester yarn.) After drying for 6 minutes at 120° C. the fabric shows an increased weight of 8.5%, indicating that 108.5 parts fabric contained 8.5 parts of the resin-forming reagents.

After curing for 10 minutes at 150° C. the fabric shows a specific area resistivity of $10^9$ ohm whereas the untreated fabric has shown a specific area resistivity of $10^{15}$ ohm. After 22 launderings in an automatic household washing machine with a synthetic household detergent the specific area resistivity is still $10^9$ ohm, indicating that the fabric has no more tendency to accumulate the electrostatic charges than a fabric woven from cotton or rayon yarn. The hand of the fabric is only slightly stiffer than that of the untreated fabric.

The finished fabric can be dyed with aqueous solutions of Azo Rhodin 2G to a deep red shade.

*Example 11*

10 parts of the condensation product of dimethyl sebacate and diethylene triamine prepared in accordance with Example 6 are dissolved in 90 parts of water to give solution A. 12 parts dichloro dimethyl xylylene [bis(chloromethyl)xylene] are dissolved in 83 parts of xylene, and 5 parts of an emulsifier consisting of the addition product of 9 mol ethyleneoxide to nonylphenol are added to the solution to give solution B. A mixture of 100 parts of A and 18 parts of B is prepared in the form of an emulsion (C).

A white nylon taffeta fabric is impregnated with C dried at 120° for 5 minutes and cured at 140° C. for 10 minutes. The fabric shows a greatly diminished specific area electric resistivity when compared with the untreated fabric, namely $10^9$ ohm compared with $10^{15}$ ohm for the untreated fabric. Even after laundering, the treated fabric shows much less tendency to accumulate electric charges than the untreated fabric.

*Example 12*

10 parts of the product of Example 3 and 1.9 parts of the compound having the approximate formula of 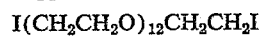 are dissolved in 88 parts of water.

This solution is used to impregnate a desized, bleached, undyed Dacron taffeta fabric on a laboratory two roll padder. After curing 10 minutes at 120° C. the pick-up (or add on) is determined and found to be 2.9% on the weight of the fabric (2.9 g. of resin per 100 g. of fabric). The fabric shows a specific area resistivity of $10^{11}$ ohm whereas the untreated fabric shows a specific area resistivity of $10^{15}$ ohm. After 10 launderings, the specific area resistivity is still $10^{12}$ ohm, indicating that the fabric does not exhibit objectionable tendency to accumulate electrostatic charges.

In a similar manner other basic polyamides and other soluble and insoluble alkylation products thereof can be prepared and used in making finishes for textile material.

The soluble basic polyamides and their soluble alkylation products can advantageously be used by applying them to textile materials together with divalent and polyvalent alkylating agents capable of acting as cross-linking agents to form insoluble finishes on the textile materials.

While the insoluble alkylation products can be separately produced they are advantageously produced on the textile materials by reaction of the soluble polyamides and the soluble alkylation products with the polyester alkylating and cross-linking agents.

Textile materials provided with insoluble finishes of this kind have the advantage that fabrics so finished can be dyed with acid dyes, as well as the advantage of imparting antistatic properties to the finished textile materials.

In producing compositions for use in the finishing of textile materials the soluble basic polyamide or the soluble alkylation product can advantageously be prepared and furnished e.g. as a concentrated solution; and the diester or other cross-linking alkylating agent can be separately prepared in an amount corresponding to the amount of soluble polyamide. And these two separate products, supplied in corresponding amounts can then be admixed or used in textile finishing after proper dilution. The textile finisher can thus be supplied with raw materials which when separately added or admixed and in proper dilution can be applied to the textile material followed by drying and heating of the treated textile material to bring about reaction of the soluble polyamide and the cross-linking agent to form the insoluble finish thereon.

We claim:

1. A process of imparting a durable finish to textile materials which comprises impregnating such materials with (a) a solution of water-soluble linear basic polyamide prepared from a dicarboxylic acid and a polyamine containing two primary amino groups and at least one amino group selected from the group of secondary and tertiary amino groups, the structure of said water-soluble polyamide containing repetitive units having the following formula

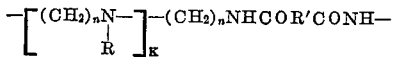

in which R is a substituent selected from the group consisting of hydrogen, alkyl, and aralkyl radicals, R' is a divalent radical selected from the group consisting of a covalent bond, and substituted and unsubstituted aliphatic, aromatic, and alkylaromatic radicals, K is an integer from 1 to 4, and $n$ is an integer from 2 to 8, and (b) a diester alkylating agent capable of cross-linking and insolubilizing said water-soluble polyamide, drying the impregnated textile material, and heating the dried impregnated textile material to form a durable antistatic finish consisting essentially of a cross-linked water-insoluble polyamido polyquaternary ammonium compound containing units having the following formula

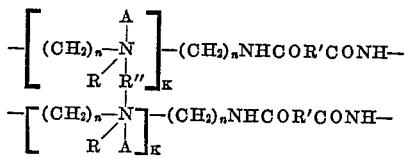

in which R, R', K and $n$ have the same meaning as above, R" is a divalent radical selected from the group consisting of substituted and unsubstituted aliphatic and alkylaromatic radicals, and A is an anion.

2. A process as defined in claim 1 in which the diester alkylating agent is a dihalide.

3. A process of imparting a durable finish to textile materials which comprises impregnating such materials with a solution of a water-soluble linear basic polyamide prepared from a dicarboxylic acid and a polyamine containing two primary amino groups and at least one amino group selected from the group of secondary and tertiary amino groups by reacting said dicarboxylic acid and polyamine to form a water-soluble polyamide, also impregnating them with a diester capable of acting as a cross-linking agent for said basic polyamides and heating the impregnated textile materials to effect cross-linking of the polyamides.

4. A process of imparting a durable finish to textile materials which comprises impregnating such materials with a solution of a water-soluble linear basic polyamide prepared from a dicarboxylic acid and a polyamine containing two primary amino groups and at least one amino group selected from the group of secondary and tertiary amino groups by reacting said dicarboxylic acid and polyamine to form a water-soluble polyamide, also impregnating them with a dihalide capable of acting as a cross-linking agent for said basic polyamides and heating the impregnated textile materials to effect cross-linking of the polyamides.

5. A process of imparting a durable finish to textile materials which comprises impregnating such materials with a solution of a water-soluble linear alkylated basic polyamide prepared from a dicarboxylic acid and a polyamine containing two primary amino groups and at least one amino group selected from the group of secondary and tertiary amino groups and alkylating the polyamide so produced, also impregnating them with a diester capable of acting as a cross-linking agent for said alkylated basic polyamides and heating the impregnated textile materials to effect cross-linking of the alkylated polyamides.

6. A process of imparting a durable finish to textile materials which comprises impregnating such materials with a solution of a water-soluble linear alkylated basic polyamide prepared from a dicarboxylic acid and a polyamine containing two primary amino groups and at least one amino group selected from the group by reacting said dicarboxylic acid and polyamine to form a water-soluble polyamide of secondary and tertiary amino groups and alkylating the polyamide so produced, also impregnating them with a dihalide capable of acting as a cross-linking agent for said basic polyamides and heating the impregnated textile materials to effect cross-linking of the alkylated polyamides.

References Cited in the file of this patent

UNITED STATES PATENTS

| | | |
|---|---|---|
| 2,483,513 | Allen et al. | Oct. 4, 1949 |
| 2,631,993 | Morgan | May 17, 1953 |
| 2,696,448 | Hammer et al. | Dec. 7, 1954 |
| 2,714,075 | Watson et al. | July 26, 1955 |

UNITED STATES PATENT OFFICE

CERTIFICATE OF CORRECTION

Patent No. 2,882,185 April 14, 1959

Emery I. Valko et al.

It is hereby certified that error appears in the printed specification of the above numbered patent requiring correction and that the said Letters Patent should read as corrected below.

Column 6, lines 42, 43 and 44, for the left-hand portion of the formul reading "—COCH$_2$CH—" read -- —COCH$_2$CH— --;
$\phantom{"—COCH_2CH—"\text{ read -- —COCH_2}}$C$_{22}$H$_{23}$ $\phantom{\text{read -- —COCH_2CH—}}$C$_{12}$H$_{23}$ column 10, lines 31, 32 and 33, strike out "by reacting said dicarboxylic acid and polyamine to form a water-soluble polyamide" and insert the same after "groups" in line 33, same column.

Signed and sealed this 18th day of August 1959.

(SEAL)
Attest:

KARL H. AXLINE
Attesting Officer

ROBERT C. WATSON
Commissioner of Patent